(12) United States Patent
Hayman et al.

(10) Patent No.: US 7,870,789 B2
(45) Date of Patent: Jan. 18, 2011

(54) SEISMIC SENSOR

(75) Inventors: Mark Jonathan Brice Hayman, Dunrobin (CA); Bruce Leigh Townsend, Stittsville (CA); Nicholas Jason Ackerley, Ottawa (CA)

(73) Assignee: Nanometrics Inc., Kanata, Ontario (CA)

( * ) Notice: Subject to any disclaimer, the term of this patent is extended or adjusted under 35 U.S.C. 154(b) by 603 days.

(21) Appl. No.: 11/945,137

(22) Filed: Nov. 26, 2007

(65) Prior Publication Data

US 2008/0134786 A1      Jun. 12, 2008

(30) Foreign Application Priority Data

Nov. 28, 2006   (CA)   ................................ 2569295

(51) Int. Cl.
*G01P 15/00* (2006.01)
(52) U.S. Cl. .................. 73/514.38; 73/514.36
(58) Field of Classification Search .............. 73/514.37, 73/488, 504.04, 504.12, 514.02, 514.36, 73/514.38
See application file for complete search history.

(56) References Cited

U.S. PATENT DOCUMENTS

| | | | | | |
|---|---|---|---|---|---|
| 1,789,055 | A | * | 1/1931 | Taylor | 73/653 |
| 1,951,358 | A | * | 3/1934 | Hayes | 367/185 |
| 2,638,578 | A | * | 5/1953 | Piety | 367/181 |
| 2,717,369 | A | * | 9/1955 | Bardeen et al. | 181/104 |
| 2,909,759 | A | * | 10/1959 | Cook | 367/186 |
| 3,194,060 | A | * | 7/1965 | Greenwood | 73/654 |
| 3,292,145 | A | | 12/1966 | Willmore | |
| 3,333,460 | A | * | 8/1967 | Reeff | 73/653 |
| 3,662,327 | A | * | 5/1972 | White | 367/181 |
| 3,713,088 | A | * | 1/1973 | Lehner et al. | 367/182 |
| 3,806,908 | A | * | 4/1974 | Bound et al. | 340/525 |
| 3,930,218 | A | * | 12/1975 | Hall, Jr. | 367/188 |
| 4,280,206 | A | * | 7/1981 | Guralp | 367/179 |
| 4,519,252 | A | * | 5/1985 | McMahon | 73/655 |
| 4,768,175 | A | * | 8/1988 | Hirayoshi | 367/178 |
| 5,010,531 | A | * | 4/1991 | McNeel | 367/188 |
| 5,983,699 | A | * | 11/1999 | Guralp et al. | 73/652 |
| 6,196,067 | B1 | * | 3/2001 | Martin et al. | 73/514.32 |
| 6,363,035 | B1 | * | 3/2002 | Canuteson et al. | 367/179 |

(Continued)

FOREIGN PATENT DOCUMENTS

GB      1 442 297      7/1976

(Continued)

OTHER PUBLICATIONS

Search Report dated Mar. 3, 2008, issued in corresponding UK Application No. GB0722940.4.

*Primary Examiner*—Hezron Williams
*Assistant Examiner*—Samir M Shah
(74) *Attorney, Agent, or Firm*—Gardere Wynne Sewell LLP (57) ABSTRACT

A seismic sensor includes a frame, a pendulum pivotably mounted to the frame, a mechanism for sensing angular position of the pendulum, and a monolithic flat spring oriented between the frame and the pendulum for balancing the pendulum at an equilibrium position. The monolithic flat spring includes: (i) an operating region for providing a restoring force to the pendulum proportional to an angular displacement of the pendulum; and (ii) a suspension region for transmitting a force to a portion of the operating region and applying a negligible bending moment to the portion of the operating region.

18 Claims, 5 Drawing Sheets

U.S. PATENT DOCUMENTS

| | | | |
|---|---|---|---|
| 6,776,042 B2 * | 8/2004 | Pike et al. | 73/514.32 |
| 7,013,745 B2 * | 3/2006 | Kolarczyk et al. | 73/866.5 |
| 7,036,374 B2 * | 5/2006 | Pike et al. | 73/514.32 |
| 7,057,974 B2 * | 6/2006 | Pakhomov et al. | 367/178 |
| 7,122,783 B1 * | 10/2006 | Pastore et al. | 250/227.14 |
| 7,376,049 B2 * | 5/2008 | Hayman et al. | 367/178 |
| 7,385,873 B2 * | 6/2008 | Hayman et al. | 367/13 |
| 7,388,806 B2 * | 6/2008 | Hayman et al. | 367/13 |
| 2004/0053647 A1 * | 3/2004 | Pakhomov et al. | 455/569.1 |
| 2006/0077757 A1 * | 4/2006 | Cox et al. | 367/25 |
| 2006/0213290 A1 * | 9/2006 | Kolarczyk et al. | 73/866.5 |

FOREIGN PATENT DOCUMENTS

| | | | |
|---|---|---|---|
| JP | 2002031178 A | * | 1/2002 |
| SU | 598005 A | * | 2/1978 |

* cited by examiner

SEISMIC SENSOR

PRIORITY CLAIM

This application claims the benefit of Canadian Patent Application No. 2,569,295 of the same title which was filed on Nov. 28, 2006.

FIELD OF THE INVENTION

The present invention relates to the field of seismic sensors and more particularly to pendulum suspension springs for use with seismic sensors.

BACKGROUND

A seismic sensor has one or more sensing elements, each designed to measure acceleration in a specific direction (subtracting constant gravitational acceleration) and to be insensitive to acceleration orthogonal to that direction. One class of seismic sensors utilizes a spring, herein called a main spring, which balances a pendulum at an equilibrium position and applies a restoring force on the pendulum towards the equilibrium position when the pendulum is displaced from the equilibrium position.

One class of main spring is characterized by having one end of the spring attached to the pendulum to apply a torque to the pendulum, and having the other end tensioned by an attached length of wire that is in turn attached to a fixed frame. An adjustment mechanism on the fixed frame can be provided that pulls the wire to adjust the tension of the spring once the seismometer is installed in position, to balance the boom at the desired equilibrium position. The use of a flexible wire allows the adjustment mechanism to be positioned at a convenient distance from the end of the spring and allows the adjustment mechanism more degrees of freedom than if the end of the spring was fixed directly to the adjustment mechanism. This arrangement has several disadvantages, including:

the attachment of the wire to the end of the spring usually requires a lumped mass at the attachment point, typically consisting of a screw, washer and nut, and this lumped mass at the end of the spring can give rise to undesirable resonances;

it is difficult to assemble the spring so that the wire is perfectly straight and free of bends or kinks when installed. The bends may creep or relax over the operating life of the seismometer, causing unwanted spurious signals (noise) in the output;

the wire must be thin to be sufficiently flexible, which makes it susceptible to breaking due to mechanical shock in transport or handling; and the wire is subject to stress concentration at the ends where it is attached and is particularly susceptible to breakage at these points.

Another class of main springs is characterized by having one end of the spring attached to the pendulum to apply a torque to the pendulum, while having the other end directly attached to a fixed frame. An adjustment mechanism on the fixed frame may be provided that varies the torque applied to the end of the main spring to balance the pendulum at the desired equilibrium position. This arrangement also has disadvantages, including:

it is difficult to make a pure kinematic adjustment mechanism that adjusts the position of the end of a flat spring, and therefore the adjustment mechanism can be a source of spurious transient signals or noise, sometimes also called "pops"; and with both ends fixed, the spring geometry and therefore tension will change as the length varies due to thermal expansion. This is undesirable as temperature changes can modulate the output signal and be falsely seen as seismic disturbances.

There is a need to provide seismic sensors having main springs that address at least some of the previously recited disadvantages.

SUMMARY

Certain exemplary embodiments provide a seismic sensor comprising a frame, a pendulum pivotably mounted to the frame, means for sensing angular position of the pendulum, and a monolithic flat spring oriented between the frame and the pendulum for balancing the pendulum at an equilibrium position; the monolithic flat spring comprising: i) an operating region for providing a restoring force to the pendulum proportional to an angular displacement of the pendulum; and ii) a suspension region for transmitting a force to a portion of the operating region and applying a negligible bending moment to said portion of the operating region.

DETAILED DESCRIPTION

Figure 1:
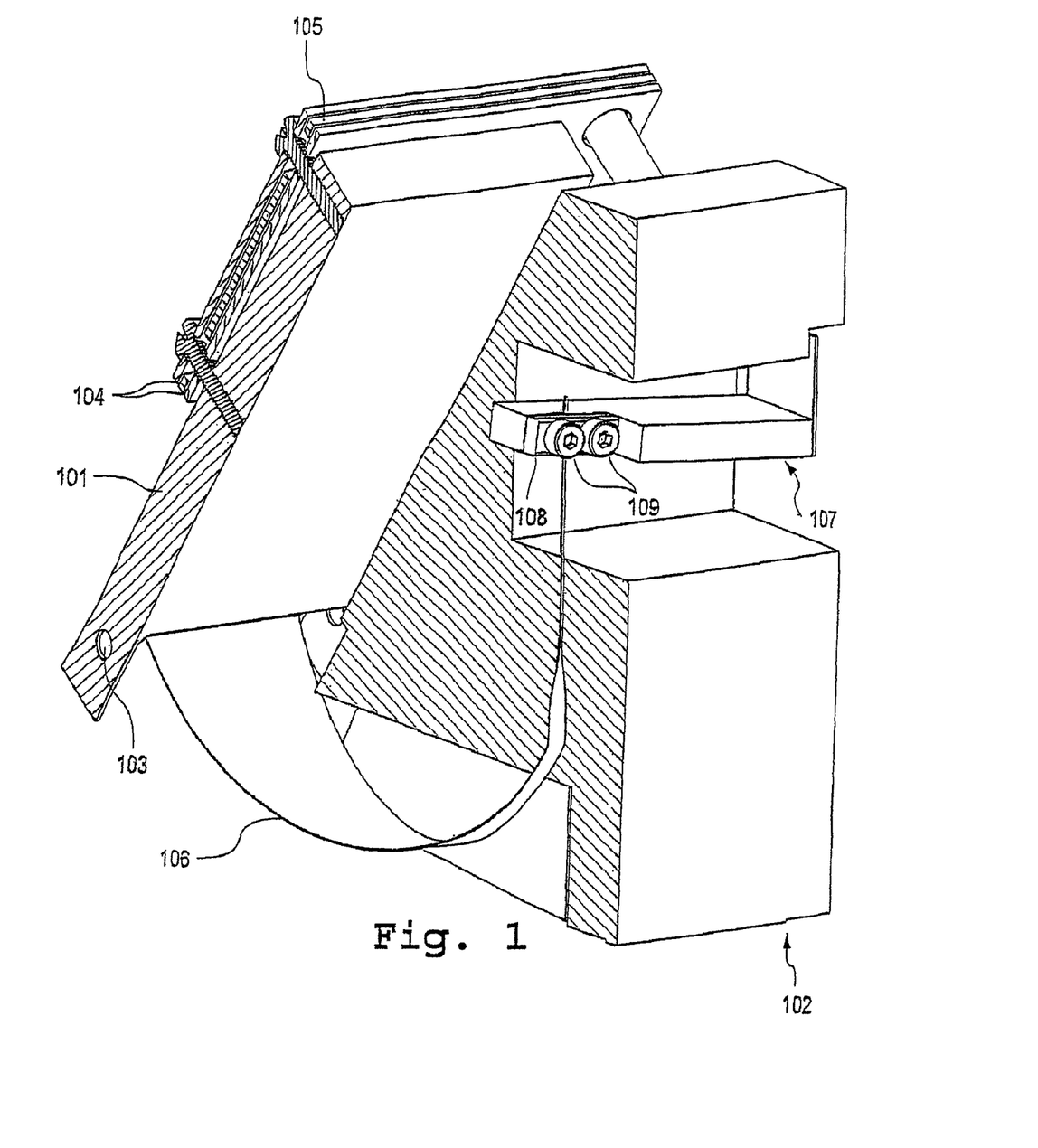
FIG. 1 illustrates a schematic perspective cut-away view of a seismic sensor incorporating a monolithic flat spring apparatus.

FIG. 1 illustrates a seismic sensor. An inertial mass called a pendulum 101 is attached to a frame 102 by a suspension means 103 that permits the pendulum 101 to pivot without appreciable mechanical friction about the axis of the suspension means 103. A capacitive displacement transducer comprising two metal plates 104 attached to the pendulum 101 and a center metal plate 105 fixed to the frame 102 positioned between the two plates 104 provides a means for an electronic component (not shown and can be located either internally or externally to the seismometer containing the seismic sensor) to sense angular position of the pendulum 101 relative to a null point. The null point is defined as the position where the center plate 105 is equidistant from the two metal plates 104.

A monolithic flat spring 106 attached at one end to the pendulum 101 and at the other end to the frame 102 balances the pendulum 101 against a present force of gravity at an equilibrium position at or near the null point, and provides a restoring force that tends to return the pendulum 101 to the equilibrium position proportional to the angular displacement of the pendulum 101 from the equilibrium position. The frame 102 includes a tension adjustment mechanism 107 to adjust the tension of the monolithic flat spring 106 and thereby adjust the equilibrium position of the pendulum 101 to be as close to the null point as practical. The tension adjustment mechanism 107 acts to pull up or lower the narrow end of the monolithic flat spring 106 to increase or decrease the tension of the monolithic flat spring 106.

Figure 2:
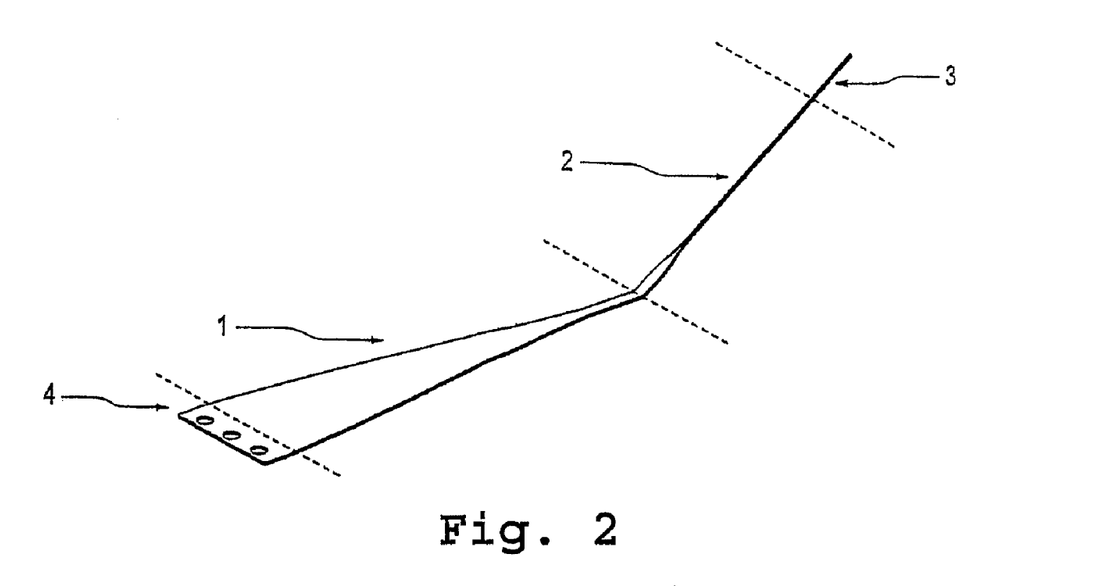
FIG. 2 illustrates a schematic perspective view of a monolithic flat spring shown in an unconstrained shape/preinstalled state (i.e., not installed in the seismic sensor)
Figure 3:
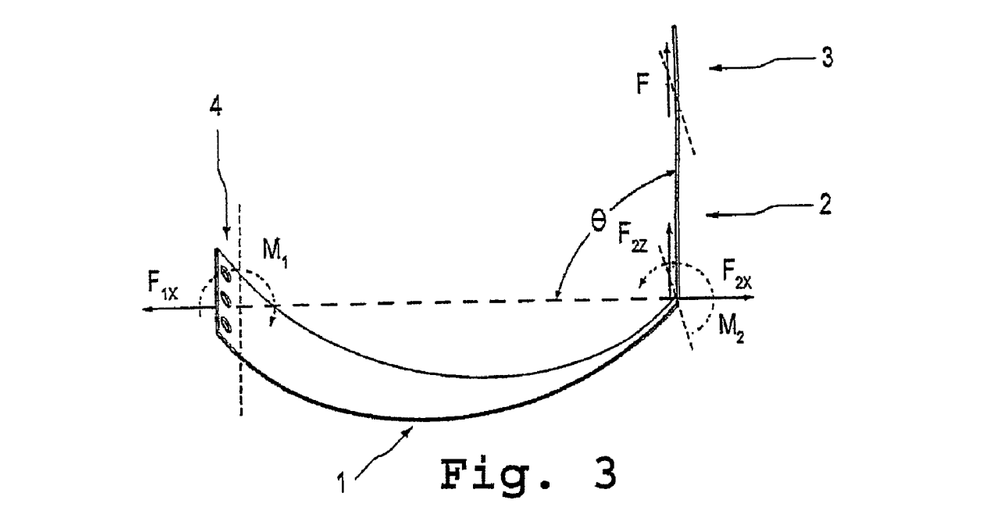
FIG. 3 illustrates a schematic perspective view of a monolithic flat spring shown in an installed shape (i.e., in a seismic sensor)

FIGS. 2 and 3 illustrate further details of a monolithic flat spring 106 for use in the seismic sensor shown in FIG. 1. FIG. 2 illustrates the monolithic flat spring 106 in a relaxed state (also termed an unconstrained shape or a preinstalled state) when not installed in the seismic sensor. FIG. 3 illustrates a free-body view of the monolithic flat spring 106 in an approximate shape it assumes when installed in the seismic sensor of FIG. 1 and balancing the pendulum 101 at its equilibrium position, showing the linear forces and bending moments applied to the monolithic flat spring 106 in normal operation. FIG. 2 identifies four functionally distinct regions within the monolithic flat spring 106: an operating region 1, a suspension region 2, a suspension attachment region 3, and an operating attachment region 4. The operating region 1 is that portion of the monolithic flat spring 106 that performs the function of a spring; the operating region 1 bends to balance a weight of the pendulum 101 at the equilibrium position and provides a restoring force to the pendulum 101 when the pendulum 101 is displaced from the equilibrium position. The suspension region 2 is that portion of the monolithic flat spring 106 that connects between one end of the operating region 1 and the frame 102 to apply a force F to that end of the operating region 1, in turn causing the operating region 1 to apply a moment $M_1$ to the pendulum 101.

The suspension attachment region is that portion of the monolithic flat spring 106 contiguous with the suspension region 2, some portion of which mates with a portion of the frame 102 to fasten one end of the monolithic flat spring 106. The suspension attachment region 3 exerts a linear force F and negligible moment on the suspension region 2. In an embodiment (illustrated in FIG. 1), the suspension attachment region 3 is fastened to the tension adjustment mechanism by an attachment means including a clamping plate 108 and screws 109. The operating attachment region is that portion of the monolithic flat spring 106 contiguous with the operating region 1, some portion of which mates with a portion of the pendulum 101 to fasten the other end of the monolithic flat spring 106. The operating attachment region 4 is fastened to the pendulum 101 by a clamping plate and screws (not shown).

In a further embodiment of the present invention, the operating region 1 is substantially flat when in a relaxed state and bends subject to a moment $M_1$ applied by the pendulum 101 once installed in the seismic sensor. The monolithic flat spring 106 is attached to the pendulum 101 near the axis of rotation of the pendulum 101. The weight of the pendulum 101 acting about the axis of rotation applies a moment $M_1$ to the end of the operating region 1 nearest the pendulum 101, causing the operating region 1 to bend into a curved shape. The other end of the operating region 1 is supported by the suspension region 2, which applies a force $F_{2Z}$ to the operating region 1 that acts to counter the moment $M_1$ according to the relationship $F_{2Z} \cdot L = M_1$ where L is the distance between the two ends of the operating region 1. The monolithic flat spring 106 has a preformed bend where the suspension region 2 and operating region 1 meet at such an angle θ to direct the suspension region 2 towards the attachment point on the frame 102 to permit it to act as a substantially straight suspension member. The suspension region 2 acts to apply a substantially linear force F with negligible moment or torque ($M_2 \ll M_1$) to the end of the operating region 1 it acts upon. In one example, the angle θ can be set to be approximately 90 degrees to an imaginary plane P defined by the axis of rotation of the pendulum 101 and the point where the operating region 1 adjoins the suspension region 2, such that the force F applied by the suspension region 2 to the operating region 1 is a substantially orthogonal force $F_{2Z}$ with negligible lateral force $F_{2X}$. Because the lateral forces $F_{1X}$ and $F_{2X}$ are equal and opposite ($F_{2X} = F_{1X}$), setting θ to be approximately 90 degrees such that $F_{1X}$ is negligible effectively eliminates lateral forces exerted on the suspension means 103.

The stiffness of the monolithic flat spring 106 at a given point along its length is defined as the tendency of the spring to resist bending when subjected to a bending moment applied at that point. The stiffness at a given point can be expressed as the product of the radius of curvature of the monolithic flat spring 106 at that point and the bending moment exerted at that point. The bending moment applied to the monolithic flat spring 106 at a given point along the operating region 1 is in relation to the distance between that point and the end of the operating region 1 adjoining the suspension region 2.

The stiffness of the operating region 1 is greatest at the end adjoining the operating attachment region 4 and reduces along the length of the operating region 1 to a negligible stiffness at the end adjoining the suspension region 2, such that the operating region 1 bends uniformly along its length. The thickness of the monolithic flat spring 106 being constant, the stiffness at a given point is proportional to the width that is set to be greatest near the operating attachment region 4 and reduces along the length of the operating region 1 towards the suspension region 2 at which end the width and consequent stiffness is negligible. The width of the operating region 1 at each point along its length is set such that the radius of curvature of the operating region 1 is substantially constant when the monolithic flat spring 106 is installed in the seismic sensor.

A further embodiment is illustrated in FIG. 2. The suspension region 2 has substantially lower average stiffness than the average stiffness of the operating region 1, such that the suspension region 2 acts as a flexible wire. The suspension region 2 is thus able to conform flexibly without applying a significant moment to the end of the operating region 1. Features of a flexible suspension region include:

the seismic sensor is tolerant of an inexact preformed bend of the monolithic flat spring 106; and the seismic sensor is tolerant of a varying radius of curvature of the operating region 1 resulting from operation of the tension adjustment mechanism 107 that tightens or loosens the tension in the monolithic flat spring 106, which in turn changes the angular orientation of the suspension region 2.

Figure 4:
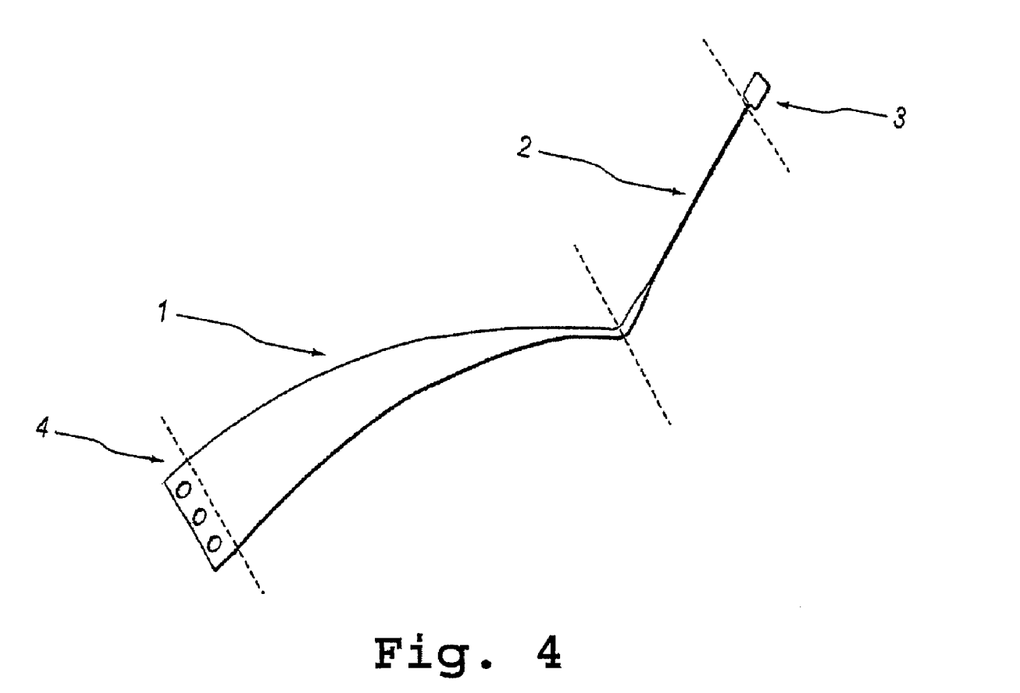
FIG. 4 illustrates a schematic perspective view of a monolithic flat spring shown in an unconstrained shape.
Figure 5:
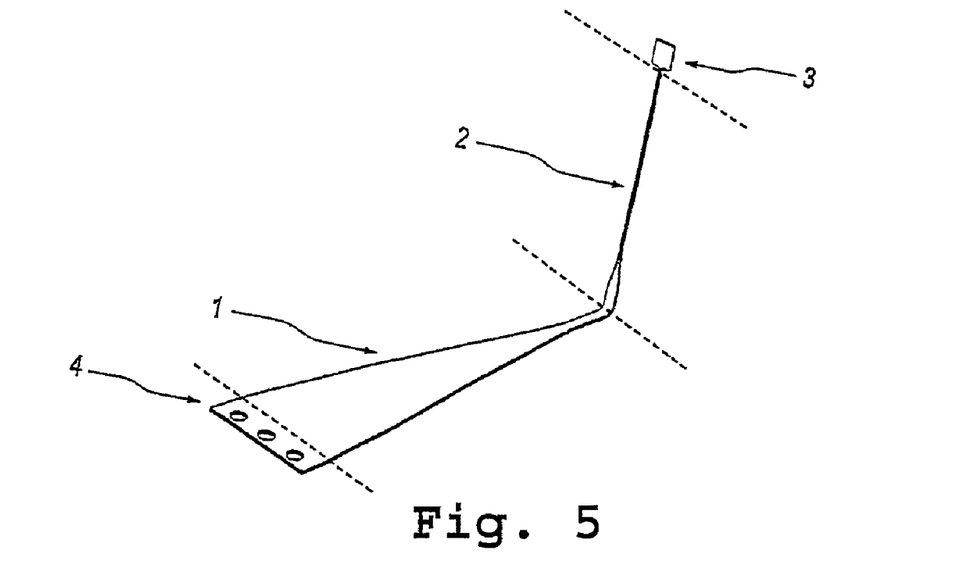
FIG. 5 illustrates a schematic perspective view of a monolithic flat spring shown in an installed shape.

FIGS. 4 and 5 illustrate a further embodiment of a monolithic flat spring 106 for use in a seismic sensor. In particular, FIG. 4 illustrates the monolithic flat spring 106 in a relaxed state when not installed in the seismic sensor. The operating region 1 is preformed to have a curved shape that is of a curvature such that once the monolithic flat spring 106 is installed in the seismic sensor the operating region 1 assumes a substantially straight shape when balancing the pendulum 101 at the equilibrium position as illustrated in FIG. 5. FIG. 4 illustrates a suspension attachment region 3 having substantially greater stiffness than the suspension region 2. The stiffer suspension attachment region 3 provides a more robust means of attaching the relatively fragile suspension region 2 to the frame 102.

Figure 6:
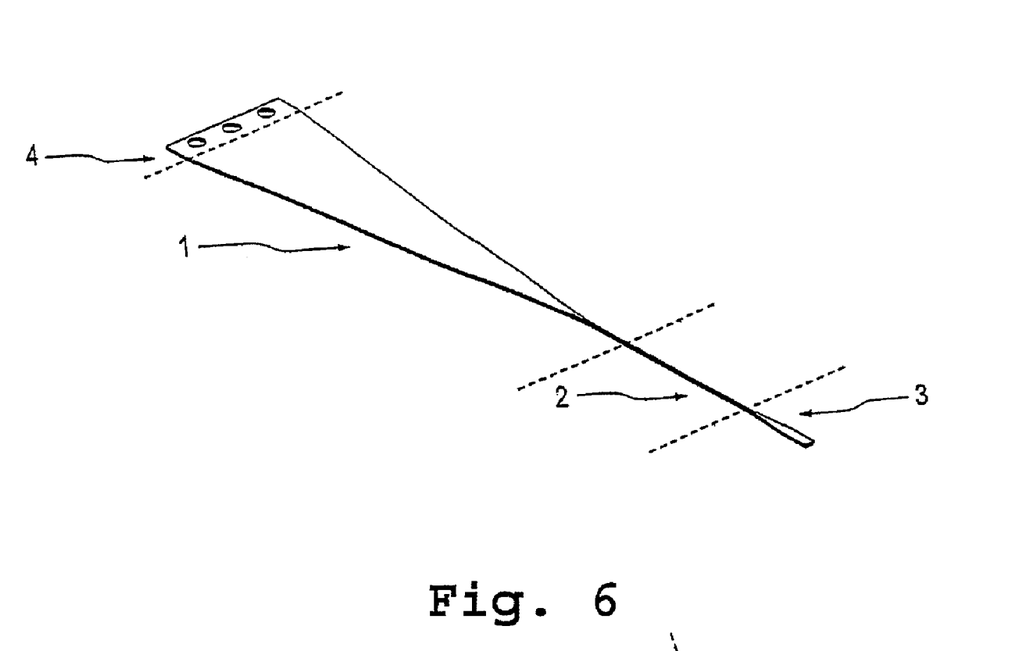
FIG. 6 illustrates a schematic perspective view of a monolithic flat spring shown in an unconstrained shape.

FIG. 6 illustrates another example of a suspension attachment region 3. The width and consequent stiffness of the monolithic flat spring 106 near the place where the suspension attachment region 3 and the suspension region 2 adjoin varies along its length to smoothly vary from the narrower width of the suspension region 2 to the greater width of the suspension attachment region 3 in order to minimize the tendency for bending stress due to transverse vibration of the suspension region 2 to concentrate at a specific point.

Figure 7:
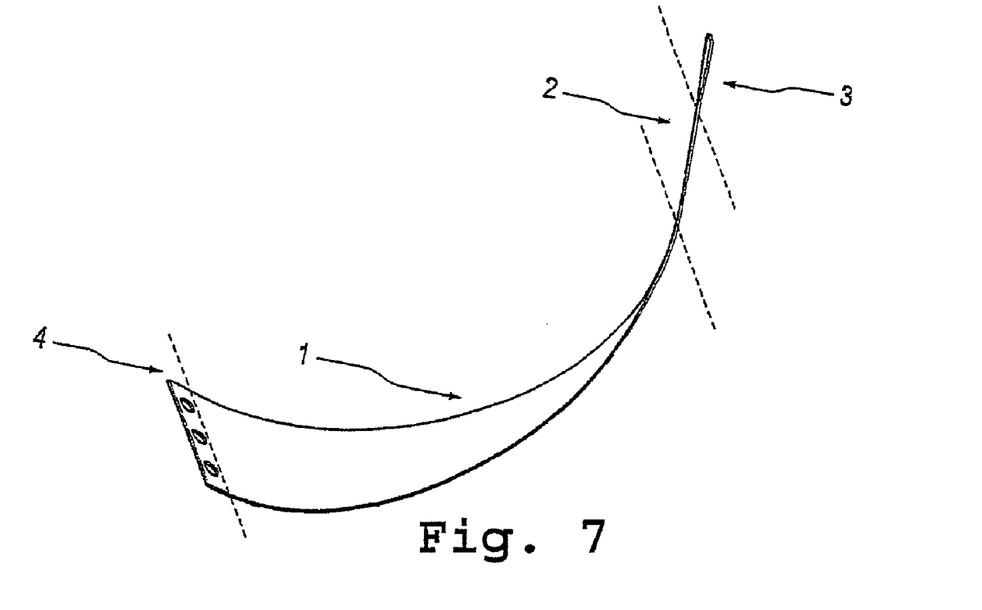
FIG. 7 illustrates a schematic perspective view of a monolithic flat spring shown in an installed shape.

FIGS. 6 and 7 illustrate a further embodiment of a monolithic flat spring 106 for use in a seismic sensor. In particular, FIG. 6 illustrates the monolithic flat spring 106 in a relaxed state when not installed in the seismic sensor. The monolithic flat spring 106 is substantially straight having no preformed bends. FIG. 7 illustrates a free-body view of the monolithic flat spring 106 in an approximate shape it assumes when installed in the seismic sensor of FIG. 1 and balancing the pendulum 101 at its equilibrium position. The width of the operating region 1 smoothly reduces from the width of the operating attachment region 4 to the narrower width of the suspension region 2, the stiffness of the operating region 1 at a given point along the length being in proportion to the width. The seismic sensor is arranged such that the radius of curvature of the operating region 1 is substantially uniform throughout, that the curvature of the operating region 1 at the point the operating region 1 adjoins the suspension region 2 is tangential to the suspension region 2, and that the suspension region 2 remains substantially straight, as illustrated in FIG. 7. No preformed bend is required in the fabrication of the monolithic flat spring 106.

Figure 8:
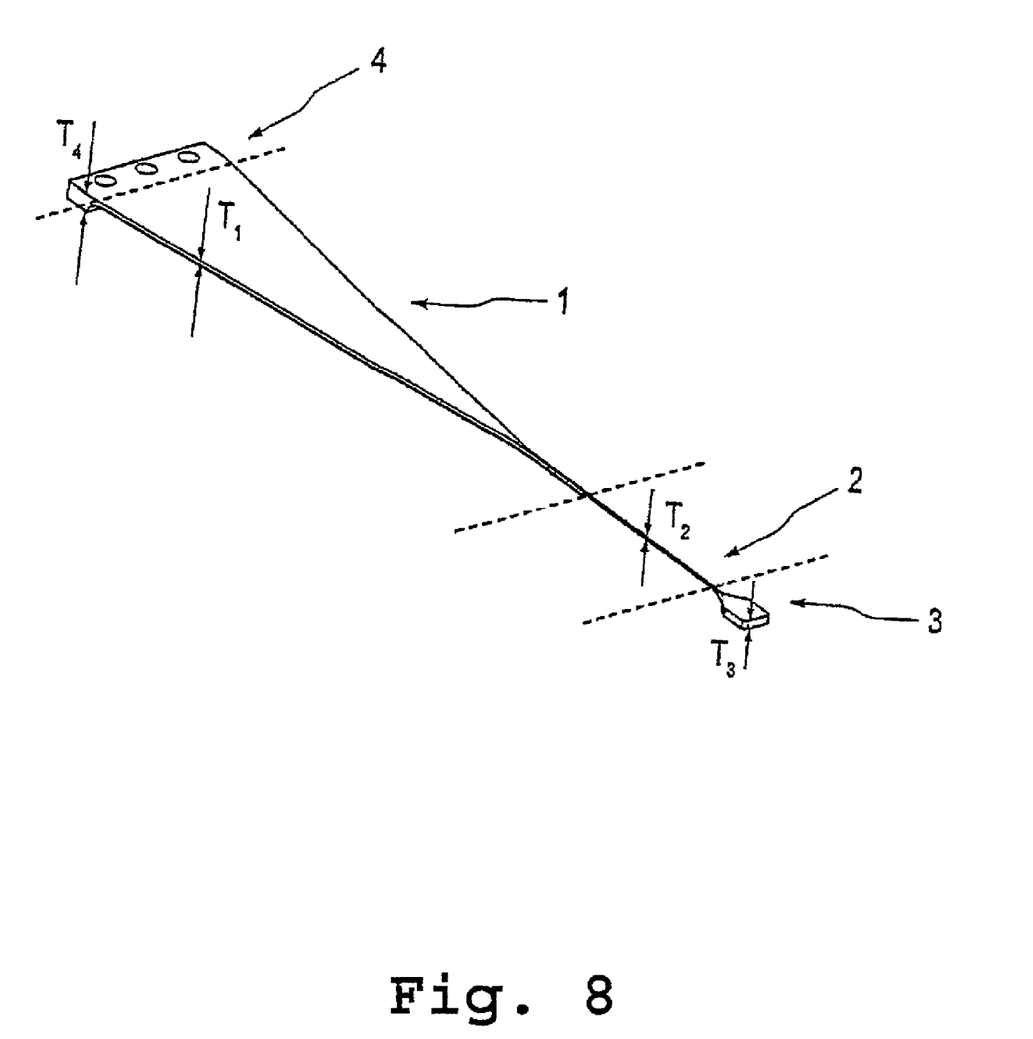
FIG. 8 illustrates a schematic perspective view of a monolithic flat spring shown in an unconstrained shape.

FIG. 8 illustrates a further embodiment of a monolithic flat spring 106 for use in a seismic sensor. The stiffness of each of the regions of the monolithic flat spring 106 is set by varying the width and thickness of the monolithic flat spring 106 along its length. The operating attachment region 4 substantially resists bending when subject to the bending moment applied at the junction of the operating attachment region 4 and the operating region 1. In particular, there is no tendency for the operating attachment region 4 to bend in the area mating to the pendulum 101. This can be achieved by having the operating attachment region 4 substantially thicker than the operating region 1.

The thickness T1 of the operating region 1 establishes an average stiffness sufficiently great to balance the weight of the pendulum 101 and sufficiently low so that the natural frequency of oscillation of the pendulum 101 is as low as can be practically achieved subject to other physical parameters of the seismic sensor. The thickness T4 of the operating attachment region 4 can be three times T1 or more, the stiffness being proportional to the cube of the thickness so that the operating attachment region 4 is 27 times or more stiff than the operating region 1. The thickness T2 and the width of the suspension region 2 are set equal so that the suspension region 2 is symmetrically flexible. The thickness T3 of the suspension attachment region 3 is set to be of a convenient thickness for attaching to the frame 102.

In a further embodiment of the seismic sensor (not illustrated), the monolithic flat spring including those embodiments of the monolithic flat spring as illustrated in FIGS. 2-8 may be installed in the seismic sensor such that the operating attachment region 4 is attached to the frame and the suspension attachment region 3 is attached to the pendulum. The suspension region 2 acts to apply a linear force to the pendulum to balance the pendulum at the equilibrium position. The frame applies a bending moment to the operating region 1 to tension the monolithic flat spring.

The invention claimed is:

1. A seismic sensor comprising:
   a frame;
   a pendulum pivotably mounted to the frame;
   means for sensing angular position of the pendulum; and
   a monolithic flat spring oriented between the frame and the pendulum for balancing the pendulum at an equilibrium position; the monolithic flat spring comprising:
   i) an operating region for providing a restoring force to the pendulum proportional to an angular displacement of the pendulum; and
   ii) a suspension region for transmitting a force to a portion of the operating region and applying a negligible bending moment to said portion of the operating region.

2. The seismic sensor of claim 1, wherein the operating region of the monolithic flat spring has a first average stiffness and the suspension region has a second average stiffness wherein the second average stiffness is substantially less than the first average stiffness.

3. The seismic sensor of claim 2, wherein the monolithic flat spring includes a preformed bend between the operating region and the suspension region, the preformed bend being of a predetermined angle such that the suspension region is substantially straight when in an installed position in the seismic sensor.

4. The seismic sensor of claim 2, wherein the monolithic flat spring, in a preinstalled state, is substantially straight and wherein the operating region of the monolithic flat spring resiliently deforms when installed in the seismic sensor such that the suspension region remains substantially straight.

5. The seismic sensor of claim 2, wherein the monolithic flat spring is substantially uniform in thickness and wherein stiffness varies along the length of the monolithic flat spring in relation to a variable width of the monolithic flat spring.

6. The seismic sensor of claim 2, wherein stiffness varies along the length of the monolithic flat spring in relation to a variable thickness of the monolithic flat spring.

7. The seismic sensor of claim 2, wherein stiffness varies along the length of the monolithic flat spring in relation to a variable thickness and a variable width of the monolithic flat spring.

8. The seismic sensor of claim 2, the monolithic flat spring further comprising a suspension attachment region contiguous with the suspension region.

9. The seismic sensor of claim 8, wherein the average stiffness of the suspension attachment region is significantly greater than the average stiffness of the suspension region.

10. The seismic sensor of claim 9, wherein the stiffness of the monolithic flat spring varies gradually from the lesser stiffness of the suspension region to the greater stiffness of the suspension attachment region such that bending stress due to transverse vibration of the suspension region is not concentrated at the suspension attachment region.

11. The seismic sensor of claim 8, wherein the monolithic flat spring is arranged between the frame and the pendulum such that the force exerted by the suspension attachment region upon the suspension region is substantially tensile.

12. The seismic sensor of claim 2, the monolithic flat spring apparatus further comprising an operating attachment region contiguous with the operating region.

13. The seismic sensor of claim 12, wherein the average stiffness of the operating attachment region is significantly greater than the average stiffness of the operating region.

14. The seismic sensor of claim 13, wherein the average thickness of the operating attachment region is significantly greater than the average thickness of the operating region.

15. The seismic sensor of claim 12, wherein the monolithic flat spring is arranged between the frame and the pendulum such that the force exerted by the operating attachment region upon the operating region is substantially a bending moment.

16. The seismic sensor of claim 2, wherein the operating region is preformed to have a curved shape when in a preinstalled state so that the operating region is resiliently deformed to a substantially straight shape when in an installed position in the seismic sensor.

17. The seismic sensor of claim 2, wherein the operating region is substantially straight when in a preinstalled state so that the operating region is resiliently deformed to a substantially curved shape when in an installed position in the seismic sensor.

18. The seismic sensor of claim 17, wherein the stiffness of the operating region varies in a predetermined way along the length of the operating region such that the operating region has a substantially uniform radius of curvature when in an installed position in the seismic sensor.

* * * * *